Nov. 23, 1937.    R. H. DRAEGER    2,099,681
CAMERA INDEXING MECHANISM
Filed May 9, 1935    2 Sheets-Sheet 1
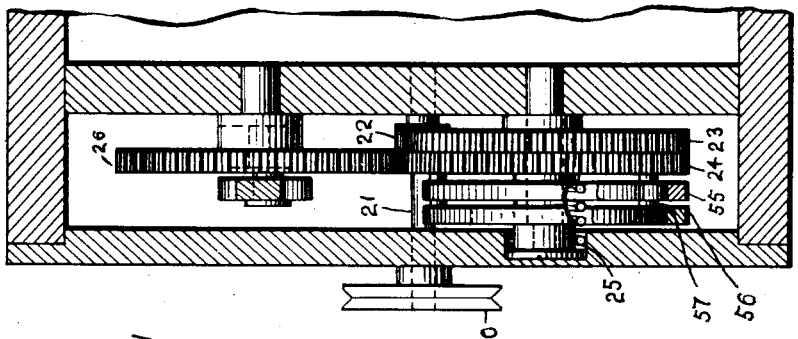
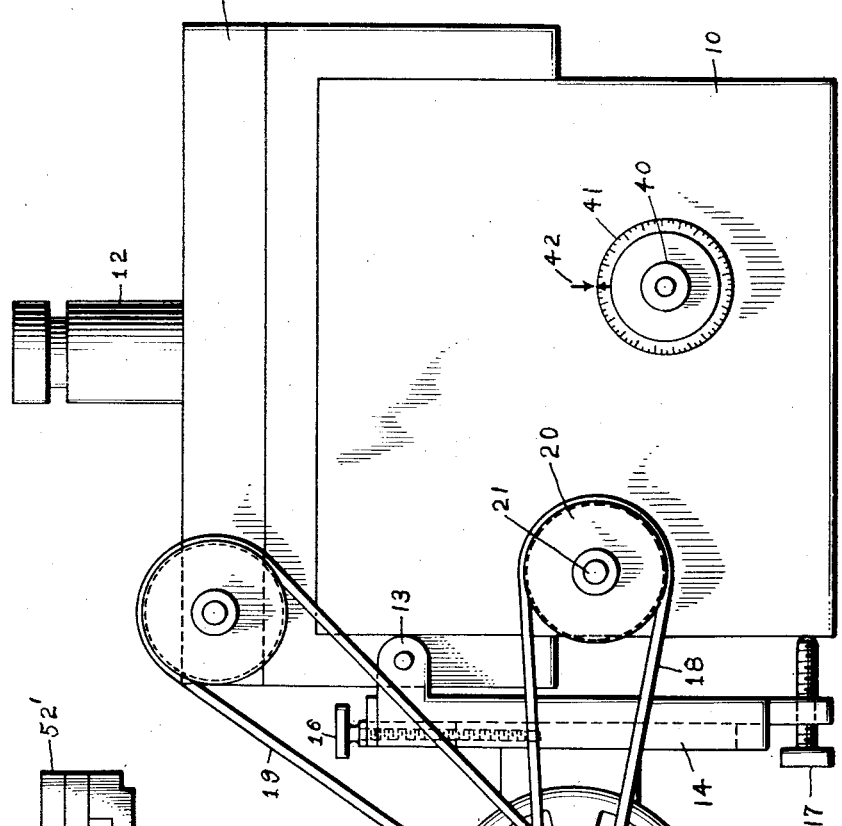
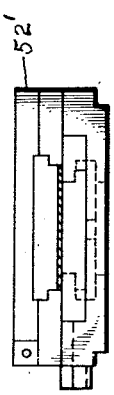

Nov. 23, 1937.   R. H. DRAEGER   2,099,681
CAMERA INDEXING MECHANISM
Filed May 9, 1935   2 Sheets-Sheet 2
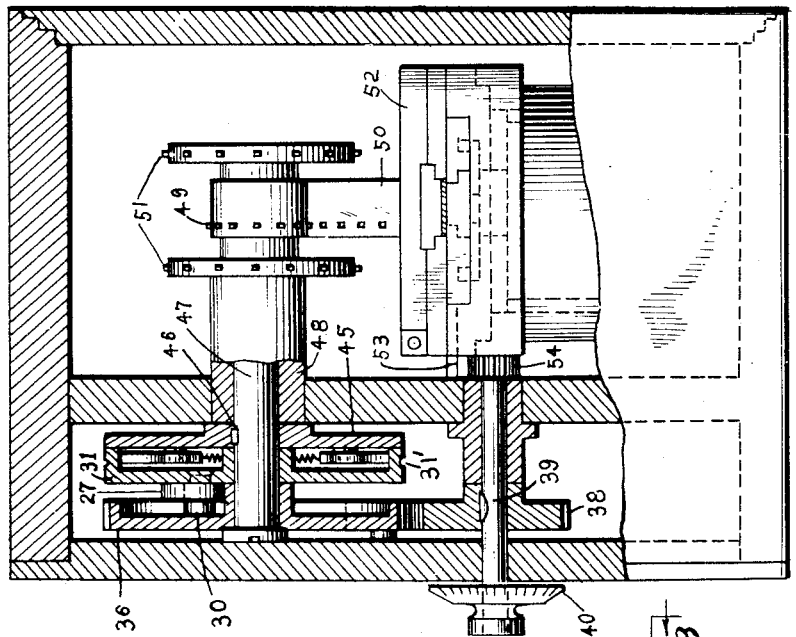
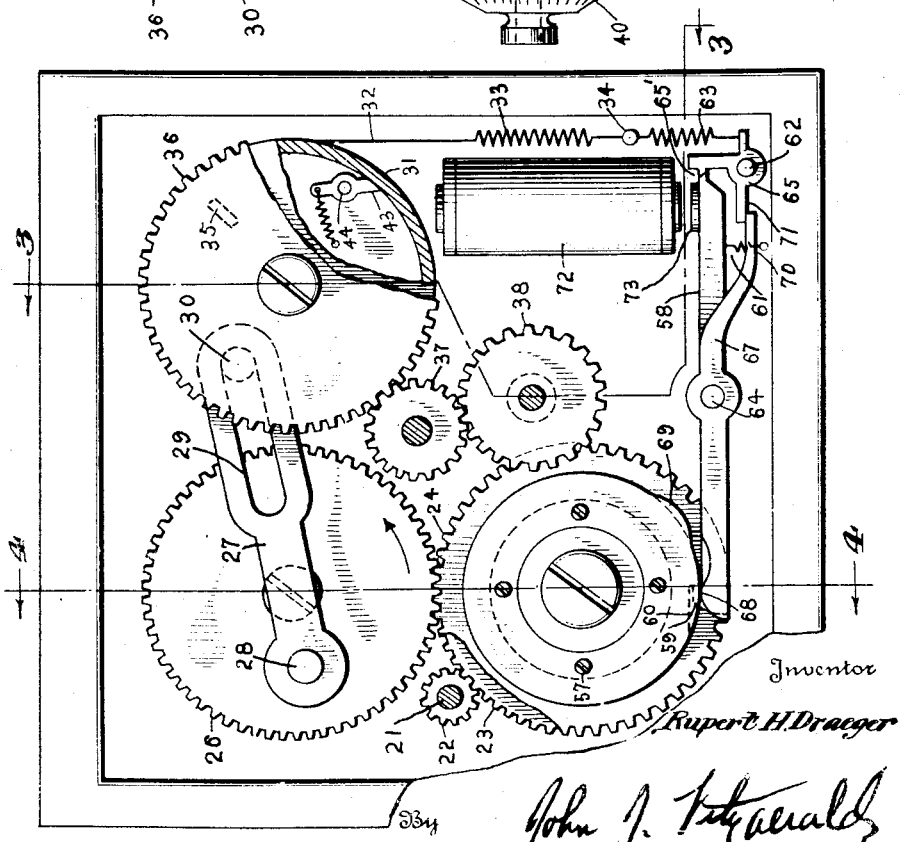

Patented Nov. 23, 1937

2,099,681

UNITED STATES PATENT OFFICE 2,099,681

CAMERA INDEXING MECHANISM

Rupert H. Draeger, United States Navy

Application May 9, 1935, Serial No. 20,613

7 Claims. (Cl. 95—31)

(Granted under the act of March 3, 1883, as amended April 30, 1928; 370 O. G. 757)

This invention relates to indexing mechanism for camera film used in copying cameras, enlarging cameras and the like.

This invention relates particularly to copying cameras used for books, manuscripts, maps, photographs and similar material wherein a variety of sizes and shapes of pages is encountered. One dimension of the page can be fitted to the width of the film by adjusting the reduction ratio, that is, by adjusting the distance from the camera to the object being copied. The other dimension will then cover a certain definite length of film. The film must be advanced by exactly this length between this exposure and the next exposure in order to avoid overlaps or gaps between successive pictures. With this invention, it becomes possible to set the film gate to a predetermined size and to automatically rotate the film sprocket so that exactly that amount of the film which the film gate exposes is advanced, allowing just the proper amount of film for the succeeding exposure so that there will not be any substantial gap or overlap between one image and the next. A single manually controllable mechanism adjusts both to the width of the film gate and the amount that the film will be advanced to furnish the correct amount of film for the successive images with the film gate so set.

With the above and other objects in view, the invention consists in the construction, combination and arrangement of parts as will be hereinafter more fully described.

Fig. 1 is a view of one side of the camera, the usual film magazine being omitted.

Fig. 2 is a view looking into the camera similar to Fig. 1 with the back plate omitted.

Fig. 3 is a section in line 3—3 of Fig. 2.

Fig. 4 is a section in line 4—4 of Fig. 2.

Fig. 5 is an end view of a different size adjustable film gate.

There is shown at 10 the camera case supported by the yoke 11 and the yoke stem 12 adapted to be held in any suitable support. The yoke 11 carries the hinge motor support 13 on which is mounted the motor, the slide plate 14 carrying the motor 15 in the usual customary manner. Thumb screws 16 and 17 are provided for the purpose of adjusting the index drive belt 18 and the take-up belt 19. The index drive belt 18 operates the pulley 20 mounted on the shaft 21 which carries a spur gear 22. This spur gear 22 is in mesh with a large spur gear 23. The spur gear 23 communicates its motion to another spur gear 24 through the medium of a friction clutch including a spring 25 pressing the spur gear 24 against the side of spur gear 23. This gear 24 in turn drives a gear 26 on which is carried a slotted connecting rod 27 by means of a pin 28. A slot 29 in this connecting rod 27 cooperates with a pin 30 projecting from clutch drum 31.

Secured in a groove 31' in the periphery of the clutch drum 31 is a flexible member 32 secured to the end of a spring 33 which is anchored as at 34. As will be apparent, the flexible member 32 and spring 33 tend to rotate the clutch drum in a clockwise direction, as viewed in Fig. 2, within the limits allowed by the pin 30 and the slot 29. Operation of the motor through the spur gears and connecting rod 27 rotates the clutch drum 31 in an opposite or counter-clockwise direction. The pin 30 extends beyond the slot 29 and makes contact with a stop 35 located on the back side of a gear 36. This gear 36 meshes through an idler gear 37 to spur gear 38 keyed on a shaft 39 carrying a manual knob 40 for rotating the same. This knob 40, as will be apparent from Fig. 1, is provided with indicia 41 cooperating with an indicator mark 42 on the face of the camera. As a result thereof knob 40 can be turned any measured amount and thereby set the position of the stop 35 at a desired point, limiting the clockwise rotation of the clutch drum 31.

As the clutch drum 31 is rotated counter-clockwise under the action of the connecting rod 27, it is gripped by clutch fingers 43 which are pinned as at 44 to a clutch plate 45 keyed as at 46 on an indexing shaft 47 extending through a bearing 48. This same shaft 47 acts as a bearing for the clutch drum 31 and the spur gear 36. Secured to this indexing shaft 47 is the indexing sprocket 49 which carries a small size film such as 16 mm. as at 50. Likewise secured to this same shaft 47 are the large film sprockets 51 intended for carrying larger films, such as 35 mm. If desired, still another film sprocket can be secured to the same shaft for using 70 mm. or other size of film. Although the film sprockets 49 and 51 are illustrated as having sprocket teeth to cooperate with the perforated film, it is contemplated that the sprocket teeth may be omitted to accommodate non-perforated film or photographic paper in the rolls. In the latter case the periphery of the rollers will preferably be of rubber, or other composition, which will frictionally grip the unperforated film or photographic paper roll.

The film 50 passes through the adjustable film gate mechanism 52. The operation of the film gate 52 is controlled by the rack 53 meshing with a spur gear keyed on shaft 39. The details of the adjustable film gate mechanism 52 form another part of this particular invention, being more fully set forth and described in copending application Serial No. 20,612, filed May 9, 1935 by the same inventor.

The film gate mechanism 52, as shown, is for handling film 50 of the 16 mm. size, and when a larger size film is substituted a larger size film gate, as at 52', shown in Fig. 5, may be substituted for the film gate mechanism 52.

The ratio of the spur gear 54 to the train of spur gears controlling the spur gear 36 is such that the amount that the adjustable film gate will be opened by rotation of the knob 40 is substantially equal to the amount that the film or photographic paper will be indexed with each operation of the connecting rod 27 through its train of gears to the motor 15, by means of the limitation imposed by the setting of the stop 35. This ratio is unchanged by substituting different size film on the different size film sprockets, due to the fact that the film sprockets are of such ratio to each other as to be unaffected by the change.

The spur gear 24 carries stop ring 55 and trip ring 56 secured to the side thereof by means of stud screws 57, so that rings 55 and 56 will partake of the same rotation as the spur gear 24. A stop lever 58 pivoted at 64 has a hooked portion 59 which cooperates with a hooked recess 60 in the stop ring 55. This hooked portion 59 is normally held in the recess 60 by means of the spring 61. The stop lever 58 is pivoted on the pin 64, and likewise pivoted on the same pin 64 is a trip lever 67 having a cammed end 68 adapted to be engaged by cam 69 on the periphery of trip ring 56. The other end 70 of the trip lever 67 engages beneath the arm 71 of stop lever catch 65, so that when cam 69 engages the end 68 of the trip lever 67 the end 70 will operate the arm 71, and partially and temporarily rotate the stop lever catch 65 on its pivot 62 against the spring 63.

In operation a suitable control mechanism is provided for properly timing and controlling the operation of the shutter, the motor, and an electromagnet 72. An armature 73 is formed on the end of the stop lever 58 and is adapted to be actuated by the electromagnet 72 during its operation. The electromagnet 72 is actuated by the same current actuating the shutter of the camera, whereupon the stop lever 58 is rotated on pivot 64 to such position that trip lever catch 65 engages stop lever 58 at 65', preventing its return when the current is cut off. Following the simultaneous operation of the shutter and electromagnet 72 the control mechanism operates the indexing mechanism through motor 15. After the exposure is finished the cam 69 strikes the cammed end 68 of the trip lever 67, thereby permitting the stop lever 58 to return to a position ready for re-engagement of its hooked end 59 with the hooked recess 60 in the stop ring 55. When this action is completed the spur gear 24 is thereby prevented from partaking of further rotation, thus stopping the operation of the spur gear 26 and connecting rod 27, and thus insuring that there will be but a single indexing movement for each exposure.

The invention described herein may be manufactured and used by or for the Government of the United States of America for governmental purposes without the payment of any royalties thereon or therefor.

I claim:

1. Film advancing means for a camera film, indexing mechanism comprising a film carrying wheel, a shaft on which said wheel is mounted and means for cyclically rotating said shaft a predeterminable amount, said means including a pair of clutch members, one of said clutch members being keyed to said shaft and the other of said clutch members being adapted to clutch said first clutch member in a film advancing direction only, and means for reciprocating said second mentioned clutch member, said reciprocating means including a pin projecting from said said second mentioned clutch member, a power rotary member, a slotted connecting member pivotally pinned to said power rotary member, the pin on said second mentioned clutch member extending through the slot of said slotted connecting member.

2. Film advanving means for a camera film indexing mechanism comprising a film carrying wheel, a shaft on which said wheel is mounted and means for cyclically rotating said shaft a predeterminable amount, said means including a pair of clutch members, one of said clutch members being keyed to said shaft and the other of said clutch members being adapted to clutch said first clutch member in a film advancing direction only and means for reciprocating said second mentioned clutch member, said reciprocating means including a pin projecting from said second mentioned clutch member, a power rotary member, a slotted connecting member pivotally pinned to said power rotary member, the pin on said second mentioned clutch member extending through the slot of said slotted connecting member, and yieldable means normally tending to rotate said second mentioned clutch member in a direction opposite to the film advancing direction.

3. Film advancing means for a camera film indexing mechanism comprising a film carrying wheel, a shaft on which said wheel is mounted and means for cyclically rotating said shaft a predeterminable amount, said means including a pair of clutch members, one of said clutch members being keyed to said shaft and the other of said clutch members being adapted to clutch said first clutch member in a film advancing direction only, and means for reciprocating said second mentioned clutch member, said reciprocating means including a pin projecting from said second mentioned clutch member, a power rotary member, a slotted connecting member pivotally pinned to said power rotary member, the pin on said second mentioned clutch member extending through the slot of said slotted connecting member, yieldable means normally tending to rotate said second mentioned clutch member in a direction opposite to the film advancing direction, and adjustable means limiting the amount that said second mentioned clutch member may be rotated by said yieldable means.

4. Film advancing means for a camera film indexing mechanism comprising a film carrying wheel, a shaft on which said wheel is mounted and means for cyclically rotating said shaft a predeterminable amount, said means including a pair of clutch members, one of said clutch members being keyed to said shaft and the other of said clutch members being adapted to clutch said first clutch member in a film advancing direction only, means for reciprocating said second mentioned clutch member, said reciprocating means including a pin projecting from said second mentioned clutch member, a power rotary member, a slotted connecting member pivotally pinned to said power rotary member, the pin on said second mentioned clutch member extending through the slot of said slotted connecting member, yieldable means normally tending to rotate said second mentioned clutch member in a direction opposite to the film advancing direction, and adjustable means limiting the amount that said second mentioned clutch member may be rotated by said yieldable means, said limiting means including a stop member extending into the path of rotation of said second mentioned clutch member, and means for predeterminately adjusting the position of said stop member.

5. Film advancing means for a camera film indexing mechanism comprising a film carrying wheel, a shaft on which said wheel is mounted and means for cyclically rotating said shaft a predeterminable amount, said means including a pair of clutch members, one of said clutch members being keyed to said shaft and the other of said clutch members being adapted to clutch said first clutch member in a film advancing direction only, means for reciprocating said second mentioned clutch member, said reciprocating means including a source of power, a train of gears between said power source and said clutch members, means for stopping rotation of said train of gears at a predetermined cycle, said stopping means including a cam ring and a stop ring cooperating with one gear of the train, an electromagnet, and an armature lever means cooperating with said electromagnet and said cam and stop rings, permitting one rotation of said cammed rings with each operation of said electromagnet.

6. A film advancing means for a camera film indexing mechanism comprising a film carrying wheel, a shaft therefor, power means for cyclically rotating said shaft, a pair of clutch members, the first of said clutch members being fastened to said shaft and the second being adapted to clutch the first in one direction only, means for reciprocating the second clutch member including a pin projecting from the latter, and a slotted connecting member between said power means and said pin.

7. Film advancing means for a camera film indexing mechanism comprising a film carrying wheel, a shaft therefor, power means for rotating said shaft, manually adjustable means for stopping the rotation of said shaft, an adjustable film gate controlled by said manually adjustable means, a pair of clutch members, the first of said clutch members being fastened to said shaft and the second being adapted to clutch the first in one direction only, means for reciprocating the second clutch member, including a pin projecting from the latter, and a slotted connecting member between said power means and said pin.

RUPERT H. DRAEGER.